I. S. MERRELL.
APPARATUS FOR DESICCATING LIQUIDS.
APPLICATION FILED MAR. 15, 1906.
985,747.
Patented Feb. 28, 1911.
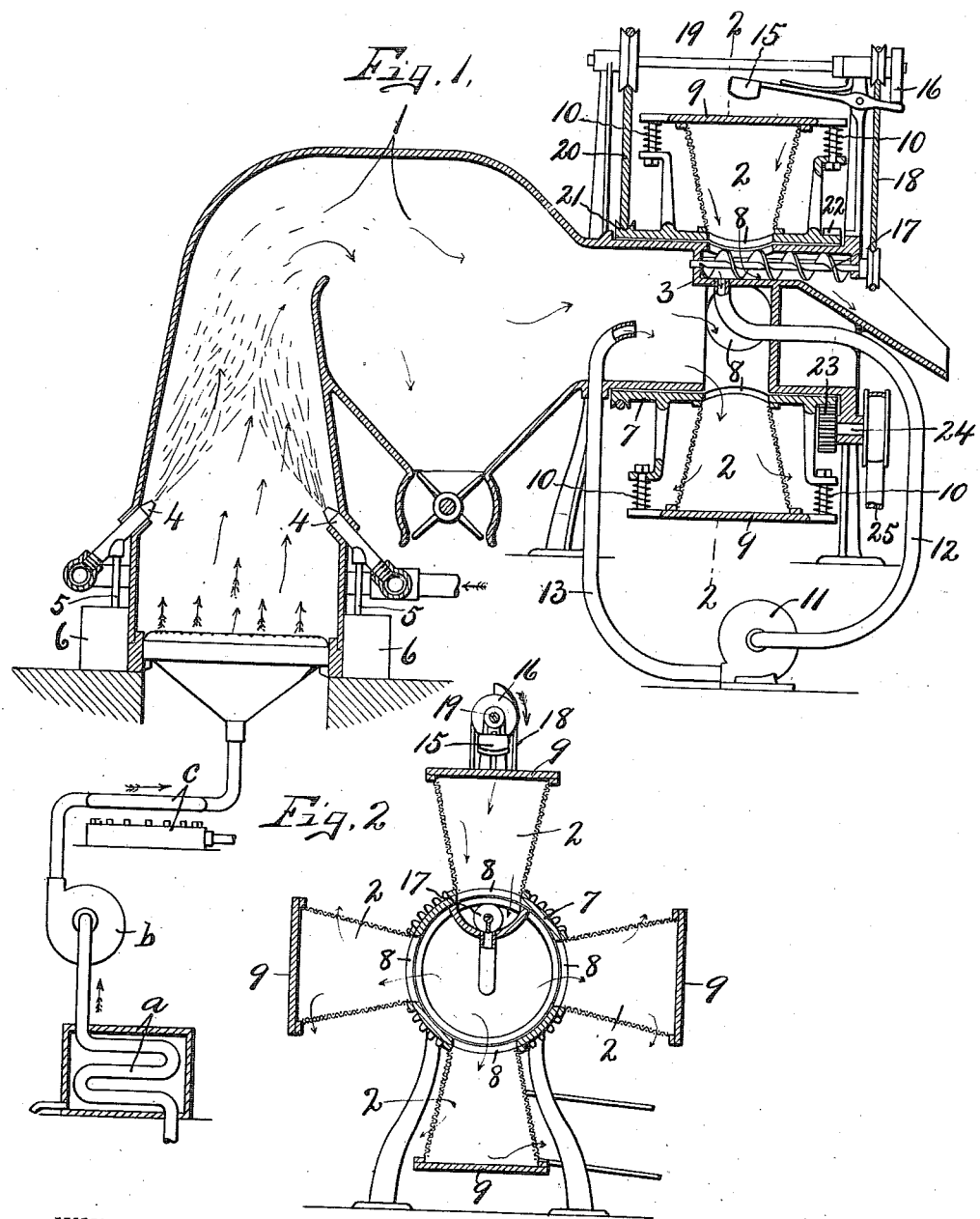

UNITED STATES PATENT OFFICE.

IRVING S. MERRELL, OF SYRACUSE, NEW YORK, ASSIGNOR TO MERRELL-SOULE COMPANY, OF SYRACUSE, NEW YORK, A CORPORATION OF NEW YORK.

APPARATUS FOR DESICCATING LIQUIDS.

985,747. Specification of Letters Patent. Patented Feb. 28, 1911.

Application filed March 15, 1906. Serial No. 306,215.

*To all whom it may concern:*

Be it known that I, IRVING S. MERRELL, of Syracuse, in the county of Onondaga, in the State of New York, have invented new and useful Improvements in Apparatus for Desiccating Liquids, of which the following, taken in connection with the accompanying drawings, is a full, clear, and exact description.

This invention relates to improvements in apparatus for desiccating milk and other liquids containing solids which it is desired to collect separate from the liquid as distinguished from the apparatus shown in my pending application No. 306,214, filed March 15, 1906. In this class of apparatus the moisture-laden air, after absorbing the moisture from the solids, is permitted to escape through a screen to the atmosphere, the screen serving to prevent the escape of the desiccated product, thereby causing the powder to collect inside of the desiccating chamber, or at least, somewhere between the screen outlet and desiccating chamber. The moisture-absorbing air is caused to circulate through the desiccating chamber, either by raising its temperature or through the medium of a mechanical circulating device, such as a suction or force-pump, whereby more or less of the comparatively fine powder or flour is carried against the screen, and after a short time it becomes clogged to such an extent as to hinder the passage of the moisture-laden air, thereby reducing the efficiency and necessitating frequent interruptions in the continuity of the process for the purpose of cleaning or removing the powder from the screens.

The essential purpose of my present invention is to provide means for continuously removing the desiccated powder or dust as it collects upon the screen and to prevent its accumulation upon the screen in order that the process may not be retarded by clogging or congestion. This object, more specifically stated, is to provide a movable dust collector with one or more screen pockets or receptacles which are successively brought into communication with the desiccating chamber and a suitable delivery conduit which is cut off from the desiccating chamber so that the open sides of the screen pockets are brought into communication with the delivery conduit, and the powder which may have accumulated therein is precipitated by its own gravity into said conduit.

Another object is to provide mechanical means for automatically agitating the screens when brought into communication with the conduit for the purpose of shaking or jarring the powder from the pocket into the conduit.

A still further object is to provide means for automatically drawing the powder by suction from the portion of the dust collector, which is in communication with the delivery conduit, into such conduit and at the same time forcing a current of air into the portion of the dust collector which is in communication with the desiccating chamber, thereby returning any powder which may be drawn into the suction device into said dust collector.

Another object is to provide mechanical means for removing the powder from the conduit as it accumulates therein.

Other objects and uses will appear in the following description.

In the drawings—Figure 1 is a sectional view of a desiccating apparatus embodying the features of my invention. Fig. 2 is a transverse vertical sectional view taken on line 2—2, Fig. 1.

This apparatus comprises essentially a desiccating chamber —1— and a rotary dust collector having a plurality of screened pockets —2— which successively communicate with the desiccating chamber and with a fixed delivery conduit —3—. The liquid, as milk, to be desiccated is introduced into the desiccating chamber together with a quantity of moisture-absorbing air through one or more atomizers or spray nozzles —4—. These spray-nozzles are connected by conduits —5— to a suitable receptacle or receptacles —6— in which the liquid to be desiccated is placed. The moisture absorbing power of the air is materially increased by passing it through a collar as —a— where part of the moisture is removed by condensation and then forcing the partially dried air under pressure of a pump as —b— through a suitable heater —c— from which it is forcibly introduced into the desiccating chamber in such quantities and at such temperature as to rapidly absorb the moisture from the finely divided liquid particles or globules without producing any chemical change or denaturalization of the solids and establishes a continuously moving current of moisture-laden air toward the outlet of the desiccating chamber with which the pockets —2— communicate. The desiccated product which is in the form of an extremely light impalpable dust or power, is carried by the moving currents of air into the pockets —2—, the moisture laden air escaping through the screen sides of the pockets to atmosphere while the powder or flour is temporarily confined in the pockets by the screens. These receptacles or pockets —2— are preferably mounted upon a rotary drum —7— which encircles the discharge end of the desiccating chamber —1— and is provided with radial openings —8—, each communicating with the interior of one of the pockets. The screen pockets —2— extend radially from the drum —7— and are preferably formed of flexible fabric having their inner ends secured to the drum and around their openings —8— and their outer ends attached to imperforate heads —9— which are movable radially, but are held in their extreme outward position by springs —10— so that the pockets may be agitated by compression and distention to remove the dry product which may adhere to its sides. It is now obvious that a portion of the desiccated product is collected in the screen pockets —2— separate from the moisture-laden air which escapes to atmosphere through the screens, and this product being extremely light and more or less adhesive and being under pressure of air from the desiccating chamber tends to accumulate against the sides of the screens, thereby retarding the passage of the moisture-laden air therethrough. In order to overcome this clogging of the screens and to render the action of the apparatus practically continuous without interruption, the inner open ends of the pockets —2— are successively brought into communication with the fixed conduit —3—, which is cut off from direct communication with the desiccating chamber, thereby cutting off direct communication between the desiccating chamber and the screen pocket which may be in communication with said conduit, and relieving the air-pressure in such pocket which enables the greater portion of the powder contained therein to precipitate into the underlying delivery conduit —3—. A partial vacuum or suction is maintained in the conduit —3— through the medium of a pump or similar suction device —11— which is connected by a conduit —12— to the conduit —3— and is provided with an additional conduit —13— discharging into the desiccating chamber, and it, therefore, follows that a partial vacuum is produced in each screen pocket as it is brought into communication with the conduit —3—, thereby augmenting the discharge of the powder from such screen pocket into the delivery conduit —3—. This dislodging of the powder from the screen pockets is further facilitated by suddenly compressing and distending the screen which may be effected by any suitable mechanical means, as for instance, a vibratory mallet —15— and actuating means therefor, as a rotary cam —16—. The action of the mallet is synchronized with the rotation of the dust collector in such manner as to beat upon each head —9— as each screen pocket is successively brought into communication with the conduit —3— thereby expediting the dislodgment of any powder which may have accumulated upon the sides of the pockets. This beating of the head —9— and counter action of the springs causes a greater or less radial agitation of the walls of each pocket while the latter is registered with the delivery conduit —3—, such agitation ceasing as soon as the pocket passes out of the path of movement of the beater —15—.

Movable in the conduit —3— is a screw conveyer —17— which is rotated continuously by means of a belt —18— to remove the powder or desiccated product as it accumulates in said conduit. The belt —18— is driven from the shaft —19— upon which the cam —16— is secured, and this shaft —19— is in turn driven by a belt —20— from a pulley —21— on the rotating drum —7—.

The drum —7— carrying the screen pockets —2— may be driven by any power transmitting mechanism, but is shown as provided with a gear —22— meshing with a pinion —23— on the shaft —24— which may be connected by a belt —25— to any available source of power, not necessary to herein illustrate or describe.

In the operation of my apparatus, the air together with the liquid to be desiccated is simultaneously introduced in an upward direction into the base of the desiccating chamber —1— in which the finely divided particles of the liquid and air commingle, the air absorbing the moisture from the solids and the latter are carried forwardly under the pressure of the moisture-laden current of air into the screen pockets —2—, some of which are always in communication with the desiccating chamber, the screens permitting the moisture-laden air to escape to atmosphere, but serve to retain the desiccated product therein. Each pocket retains more or less of the powder, being successively brought into registration with the discharge conduit —3— where the greater portion of the material automatically precipitates into the underlying delivery conduit, assisted by the action of the mallet —15— on the head —9—, and also by the partial vacuum or suction created by the suction device —11—. The powdered material discharged into the conduit —3— is continuously withdrawn therefrom by the screw —17—, and it therefore follows that the operation of the apparatus and process of desiccation is practically continuous by reason of the fact that the screens of the pockets —2— are kept free from accumulations of the powder, and, therefore, permit the moisture-laden air to pass without interruption to atmosphere.

The desiccating chamber has an outlet at its bottom closed by a valve, as in the Letters Patent of Robert Stauf, No. 666,711, January 29, 1901; and this valved outlet, as shown, is located nearer the liquid inlet than is the outlet to the dust collector. Any powder which collects at the bottom of the desiccating chamber is removed through this outlet.

What I claim is:

1. In combination with a desiccating chamber having an outlet, a delivery conduit having an inlet, and a dust collector having a plurality of screened pockets provided with open sides movable successively into communication with the outlet of the desiccating chamber and with the inlet of the delivery conduit.

2. In combination with a desiccating chamber having an outlet, a delivery conduit having an inlet, a dust collector having a plurality of screened pockets provided with open sides movable successively into communication with the outlet of the desiccating chamber and with the inlet of the delivery conduit, and a suction device connected to the conduit and discharging into the outlet.

3. In combination with a desiccating chamber having an outlet, a delivery conduit having an inlet, a dust collector having a plurality of screened pockets provided with open sides movable successively into communication with the outlet of the desiccating chamber and with the inlet of the delivery conduit, and means for agitating one side of each pocket when brought into communication with the inlet of the delivery conduit.

4. In an apparatus for separating solids from liquid, a desiccating chamber having an outlet, means for spraying the liquid into the desiccating chamber, means for introducing an aeriform moisture absorbent into contact with the sprayed liquid and directing it toward the outlet, and a rotary dust collector having pockets movable successively into and out of communication with the outlet, said pockets being provided with at least one screened side to permit the exit of the moisture-laden air and retain the desiccated product.

5. In combination with a desiccating chamber having an inlet for the liquid to be desiccated and a plurality of outlets located different distances from the inlet, a valve in the outlet nearest to the inlet, and a movable screened dust collector having a plurality of openings movable successively into and out of communication with the other outlet.

6. In combination with a desiccating chamber having an outlet and a series of pockets movable successively into and out of communication with the outlet, each pocket having at least one side thereof provided with a screen for permitting the escape of the moisture-laden air and retaining the powdered product.

7. In combination with a desiccating chamber having an outlet, a delivery device for the powdered product, a plurality of pockets, and means for successively moving said pockets into position to receive material from the outlet and into position for discharging its powdered contents into the delivery device, each pocket having one side thereof provided with a screen to permit the escape of moisture-laden air and retain the powdered product.

8. In combination with a desiccating chamber having an outlet, a delivery device for the powdered product, a plurality of pockets, means for successively moving said pockets into position to receive material from the outlet and into position for discharging its powdered contents into the delivery device, each pocket having one side thereof provided with a screen to permit the escape of moisture-laden air and retain the powdered product, and means for agitating one side of the pocket which is discharging into the delivery device.

9. A desiccating chamber, in combination with a dust collector having an inlet connecting with the desiccating chamber, and also having an air outlet and an outlet for powder; screens between said inlet and air outlet, means for successively interrupting the passage of air through each screen while the air is permitted to pass through another screen, means for removing and collecting the powder from each screen while the air is not passing through it, and means for removing the collected powder.

10. A desiccating chamber in combination with a dust collector having an inlet connecting with the desiccating chamber, and also having an air outlet and an outlet for powder; screens between said inlet and air outlet, means for successively interrupting the passage of air through each screen while the air is permitted to pass through another of
5 these screens, and means for removing and collecting the powder from each screen while the air is not passing through it.

In witness whereof I have hereunto set my hand this 13th day of March, 1906.

IRVING S. MERRELL.

Witnesses:
  M. M. NOTT,
  HOWARD P. DENISON.